United States Patent
Inoue et al.

(10) Patent No.: US 6,661,753 B2
(45) Date of Patent: Dec. 9, 2003

(54) RECORDING MEDIUM REPRODUCING DEVICE HAVING TEMPO CONTROL FUNCTION, KEY CONTROL FUNCTION AND KEY DISPLAY FUNCTION REFLECTING KEY CHANGE ACCORDING TO TEMPO CHANGE

(75) Inventors: Hideo Inoue, Mitaka (JP); Saiji Tutiya, Fuchu (JP); Yasunobu Shimizu, Tokyo (JP); Kenji Oniki, Musashino (JP)

(73) Assignee: TEAC Corporation, Tokyo (JP)

( * ) Notice: Subject to any disclaimer, the term of this patent is extended or adjusted under 35 U.S.C. 154(b) by 383 days.

(21) Appl. No.: 09/732,980

(22) Filed: Dec. 8, 2000

(65) Prior Publication Data

US 2001/0017832 A1 Aug. 30, 2001

(51) Int. Cl.$^7$ ................................................. G11B 5/09
(52) U.S. Cl. ................. 369/47.15; 369/47.2; 369/53.31; 369/59.27
(58) Field of Search ........................... 369/53.31, 53.35, 369/53.34, 47.21, 47.15, 47.2, 59.27, 124.14, 59.23; 84/DIG. 12, 605, 652, 668

(56) References Cited

U.S. PATENT DOCUMENTS

| | | | | |
|---|---|---|---|---|
| 5,313,011 A | * | 5/1994 | Koguchi | 84/609 |
| 5,426,540 A | * | 6/1995 | Mikami | 360/51 |
| 5,602,811 A | * | 2/1997 | Ogusu et al. | 369/30.05 |
| 5,952,596 A | * | 9/1999 | Kondo | 84/605 |
| 6,175,072 B1 | * | 1/2001 | Aoki | 84/636 |
| 6,281,424 B1 | * | 8/2001 | Koike et al. | 84/636 |

FOREIGN PATENT DOCUMENTS

JP        07006512 A        1/1995

* cited by examiner

Primary Examiner—Thang V. Tran
(74) Attorney, Agent, or Firm—Amerson Kill & Olick, P.C.; Eugene Lieberstein; Michael N. Meller (57) ABSTRACT

A recording medium reproducing device is provided which device varies a tempo and a key of music reproduced from audio data recorded on a recording medium. The recording medium reproducing device comprises means for calculating a variable width of the key according to a varied tempo, means for adding the variable width of the key to a variable width of the key according to a varied key so as to have a summed variable width of the key, and means for displaying the summed variable width of the key.

9 Claims, 8 Drawing Sheets

RECORDING MEDIUM REPRODUCING DEVICE HAVING TEMPO CONTROL FUNCTION, KEY CONTROL FUNCTION AND KEY DISPLAY FUNCTION REFLECTING KEY CHANGE ACCORDING TO TEMPO CHANGE

BACKGROUND OF THE INVENTION

1. Field of the Invention

The present invention generally relates to a recording medium reproducing device and, more particularly, to a recording medium reproducing device such as a CD player which displays a key of a musical composition recorded on a disc by associating a tempo control function with a key control function.

2. Description of the Related Art

Conventionally, when a player called a disc jockey (DJ) plays music, the DJ uses an analog phonograph record and a record player and controls by hand a revolution of the analog phonograph record revolving on a turntable so as to play music such as dance music.

Also, as in the case of using the analog phonograph record to play music, a player such as a DJ uses a CD (Compact Disc) on which music is recorded, varies a tempo and a key (keynote) of the music, plays back a particular phrase repeatedly, mixes favorite phrases, connects musical compositions by using a cross-fader of a mixer and so forth. A recording medium reproducing device with which a player such as a DJ can play original music serves these purposes.

The above-mentioned recording medium reproducing device has a tempo control function whereby a tempo of music and, accordingly, a key of the music are varied, and a key control function whereby only the key of the music is varied. The tempo control function creates a sound effect specific to the analog phonograph record whereby a key of music is varied naturally according to a change of a tempo of the music.

When actually using the tempo control function to vary a tempo of music, a key of the music is varied according to the change of the tempo in a manner that the key gets higher when the tempo is increased and the key gets lower when the tempo is decreased. However, a conventional recording medium reproducing device does not relate a display of a variable width of the tempo control and a display of a variable width of the key control. Therefore, when the tempo is varied by the tempo control, the display of the key control does not change, but displays a key value different from the key of the music being actually played, which is a problem that an accurate display of the key control is not achieved.

SUMMARY OF THE INVENTION

It is a general object of the present invention to provide an improved and useful recording medium reproducing device in which device the above-mentioned problems are eliminated.

A more specific object of the present invention is to provide a recording medium reproducing device which device can accurately display a change of a key according to a variable width of a tempo control.

In order to achieve the above-mentioned objects, there is provided according to one aspect of the present invention a recording medium reproducing device which adjusts a tempo and a key of music reproduced from audio data recorded on a recording medium, the device comprising:

means for calculating a variable width of the key according to a varied tempo;

means for adding the variable width of the key to a variable width of the key according to a varied key so as to have a summed variable width of the key; and means for displaying the summed variable width of the key.

According to the present invention, a variable width of a key according to a varied tempo of music of audio data is calculated. Next, the calculated variable width of the key is added to a variable width of a key according to a varied key. Then, the summed variable width of the key is displayed. This allows for accurately displaying a variable width of a key associated with a variable width of a tempo.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 1:
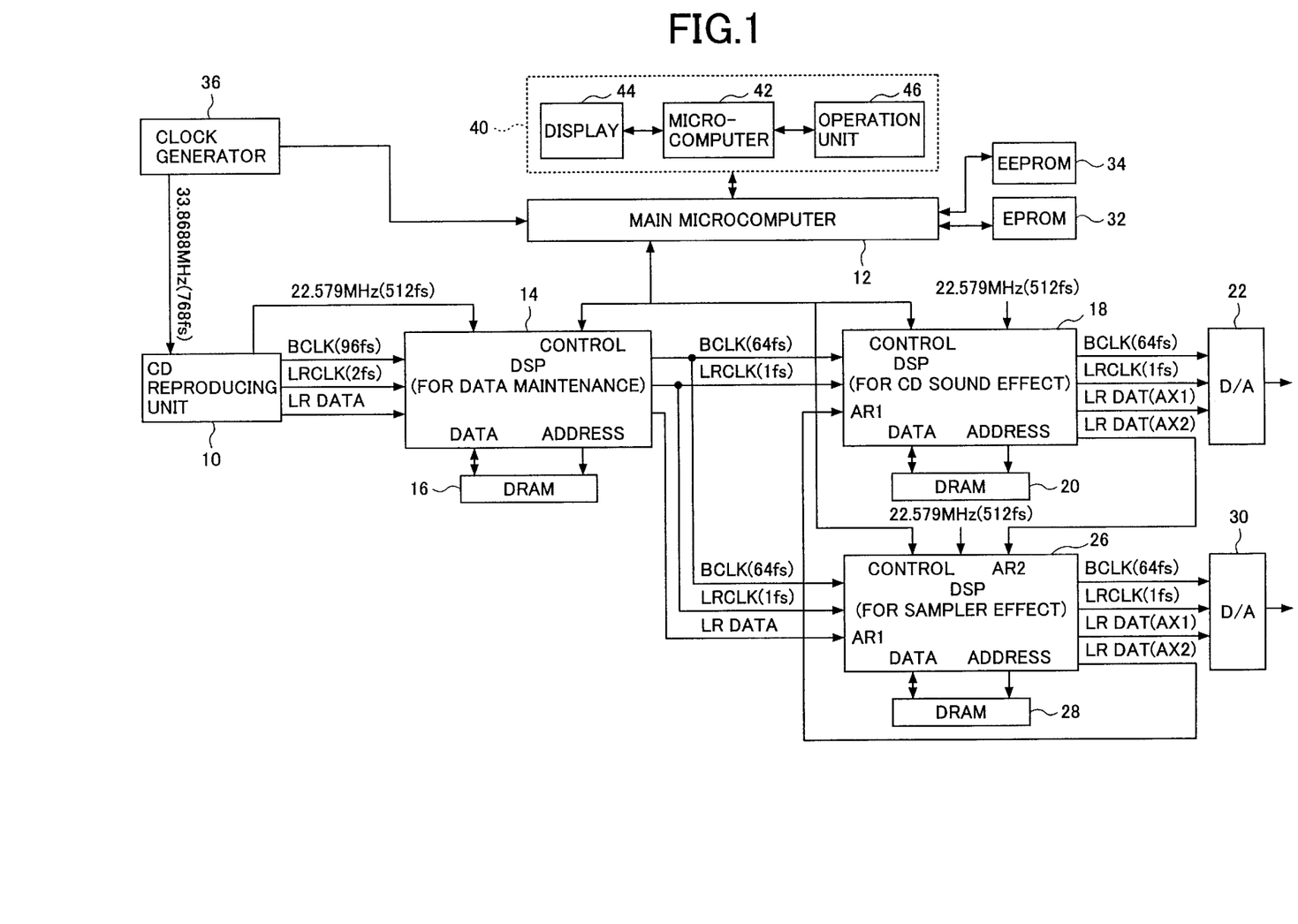
FIG. 1 is a block box diagram of a recording medium reproducing device according to an embodiment of the present invention.

FIG. 1 is a block box diagram of a recording medium reproducing device according to an embodiment of the present invention. In the figure, a CD reproducing unit 10 revolves a CD (Compact Disc), which is a recording medium, twice as fast as a normal reproducing speed. A pick-up of the CD reproducing unit 10 reproduces a double-speed reproducing signal. The double-speed reproducing signal is supplied through an RF amplifier to a DSP (Digital Signal Processor) in the CD reproducing unit 10, the DSP being used for CD reproduction. In the DSP, signal processing such as demodulation of EFM (Eight to Fourteen Modulation) and decoding of CIRC (Cross Interleaved Reed Solomon Code) is performed.

A sub-code is detached from the reproducing signal and then decoded. Sub-code data is stored in a RAM in a main microcomputer 12 according to a counter signal from the main microcomputer 12. Audio data produced after the signal processing in the DSP for CD reproduction is supplied to a DSP 14 for data maintenance.

A DRAM (Dynamic RAM) 16 for storing the audio data is connected to the DSP 14. The DSP 14 acts as a memory controller. The DRAM 16 is capable of storing the audio data for about ten seconds, for example, and is used to achieve such functions as: an anti-shock function to retain the audio data when sound skipping occurs due to a defect and the like; a quick start function to start playing a predetermined track instantly; a seamless loop function to play repeatedly between two predetermined points; a function for scratching; a function to vary a tempo of a tune; and a brake function to gradually slow down a playing speed to a halt.

The DSP 14 writes the audio data, read at double-speed, in the DRAM 16 according to a counter signal from the main microcomputer 12 and, at the same time, reads out the audio data from the DRAM 16 at a single-speed so as to supply the audio data to a DSP 18 for a CD sound effect, according to a counter signal from the main microcomputer 12.

A DRAM 20 as a working memory is connected to the DSP 18. The DSP 18 performs such sound effect processing as: an adjustment of a key (keynote); an adjustment of an output level; and a voice function to reduce a volume of only the vocals in a musical composition. The DSP 18 supplies the audio data through a digital filter to a D/A converter 22 and also supplies the audio data to a DSP 26 for a sampler effect.

A DRAM (Dynamic RAM) 28 for data storage is connected to the DSP 26. The DSP 26 acts as a memory controller. The DRAM 28 is capable of storing the audio data for about ten seconds, for example. The DSP 26 performs sampler effect processing. The DSP 26 stores, in the DRAM 28, audio data in a period from a starting point of sampling to an ending point thereof that a user specifies. The DSP 26 reads out the audio data from the DRAM 28 at playback timing that a user specifies and the DSP 26 supplies the audio data to a D/A converter 30 and the DSP 18. The DSP 18 mixes its own output audio data with the audio data from the DSP 26 and supplies the mixed audio data to the D/A converter 22.

To the main microcomputer 12 are connected an EPROM (Erasable Programmable ROM) 32 storing a program and data for processing and an EEPROM (Electrically Erasable Programmable ROM) 34 storing settings concerning a tempo, loop points and the like for each tune or track. A clock generator 36 generates a clock signal and supplies the clock signal to the CD reproducing unit 10 and the main microcomputer 12.

The main microcomputer 12 reads the sub-code from the RAM thereof according to a counter signal and supplies the sub-code data to a microcomputer 42 of a controller unit 40. The microcomputer 42 converts the sub-code to a time code and displays the time code on a display 44. The controller unit 40 comprises an operation unit 46 having various operation keys and so forth that a user operates. The operation unit 46 is connected to the microcomputer 42.

Figure 2:
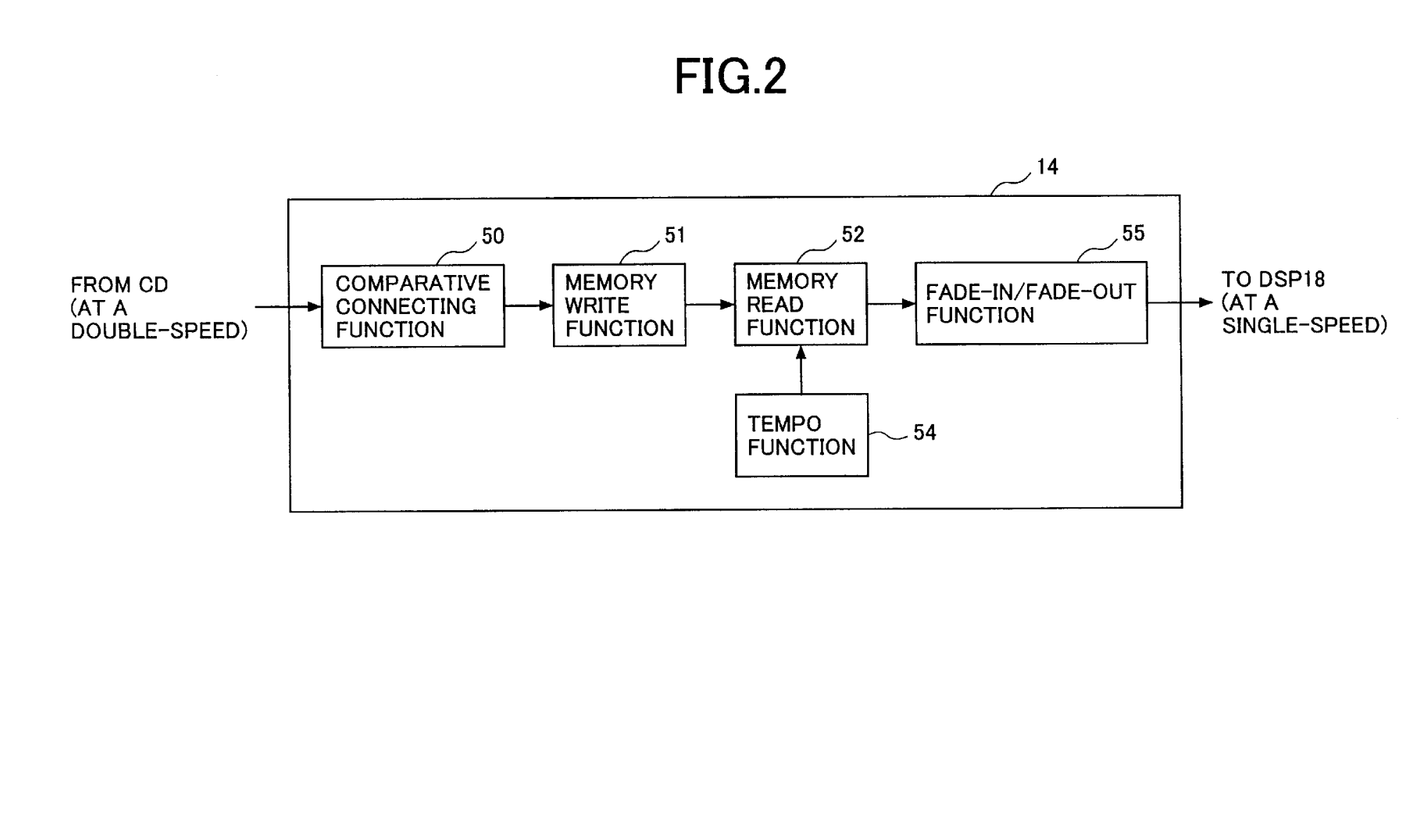
FIG. 2 is a functional block diagram of a DSP.
Figure 3:
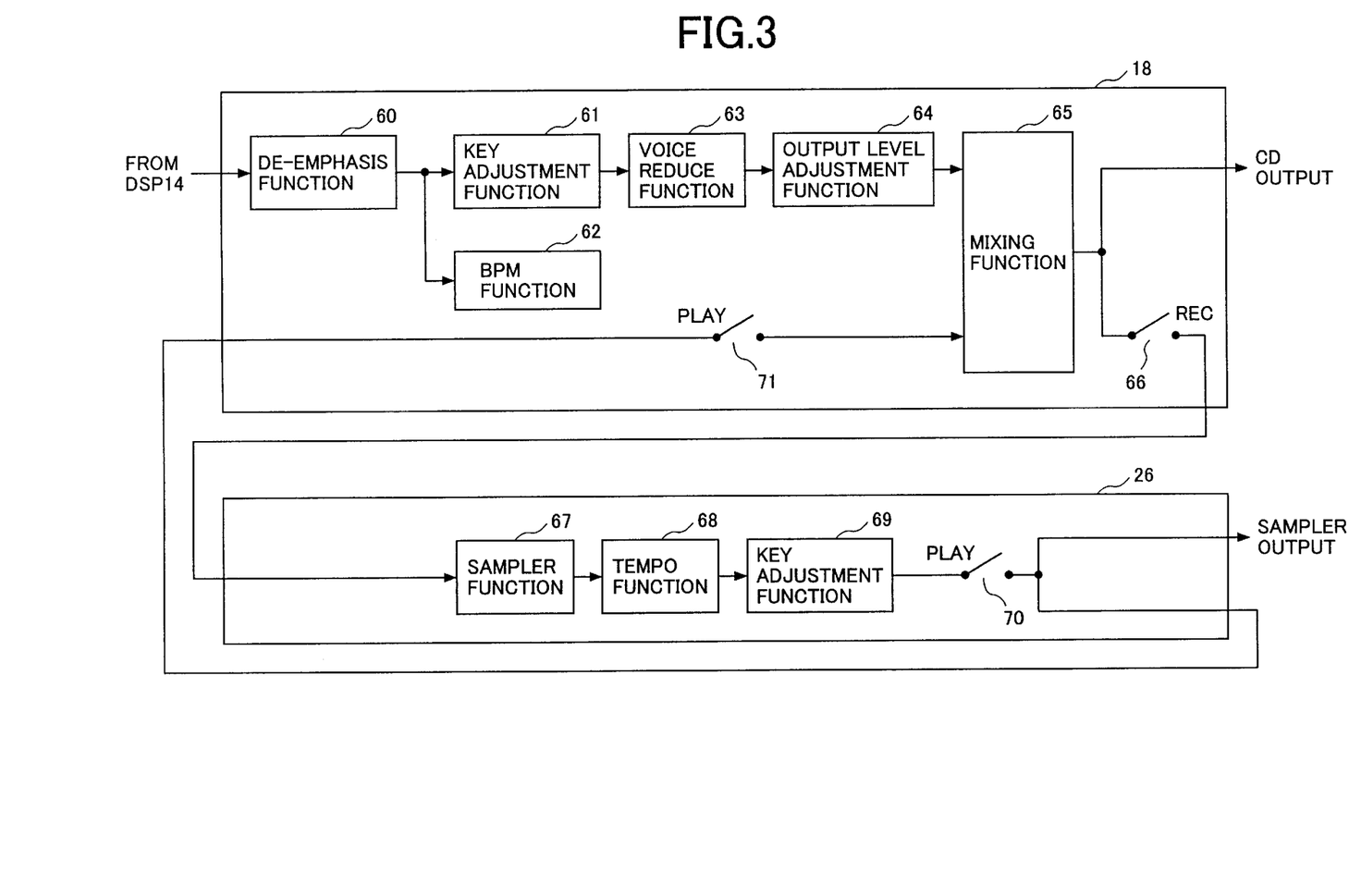
FIG. 3 is a functional block diagram of a DSP and another DSP.

FIG. 2 and FIG. 3 are functional block diagrams of the DSP 14, the DSP 18 and the DSP 26. In FIG. 2, a comparative connecting function 50 of the DSP 14 compares and connects the audio data, read at a double-speed, with the audio data of the DRAM 16, under control of a counter signal from the main microcomputer 12. A memory write function 51 writes the connected audio data in the DRAM 16. A memory read function 52 reads the audio data from the DRAM 16. A tempo function 54 varies a reading speed of the memory read function 52 to adjust a tempo. A fade-in/fade-out function 55 performs a level adjustment of the audio data during fading-in/fading-out.

In FIG. 3, a de-emphasis function 60 of the DSP 18 performs de-emphasis processing to reinstate an emphasis that was used when recording a CD. A key adjustment function 61 varies a key (keynote) while fixing a tempo. A BPM (Beat Per Minute) function 62 measures a number of beats per minute of a tune. A voice reduce function 63 reduces a volume of only the vocals in a musical composition. An output level adjustment function 64 adjusts an output level. The audio data from the output level adjustment function 64 is output through a mixing function 65 and, when a switch 66 is on, is also supplied to a sampler function 67 of the DSP 26.

The sampler function 67 writes the audio data in the DRAM 28 and, when a switch 70 is on, reads the audio data from the DRAM 28. A tempo function 68 adjusts a tempo of the audio data supplied from the sampler function 67. A key adjustment function 69 varies a key (keynote) while fixing a tempo. Thereafter, the audio data from the key adjustment function 69 is output through the switch 70 and is also supplied to the mixing function 65 through a switch 71 (which is on in accordance with the switch 70) of the DSP 18. In the mixing function 65, the audio data from the key adjustment function 69 is mixed with the audio data from the output level adjustment function 64 and then is output.

Figure 4:
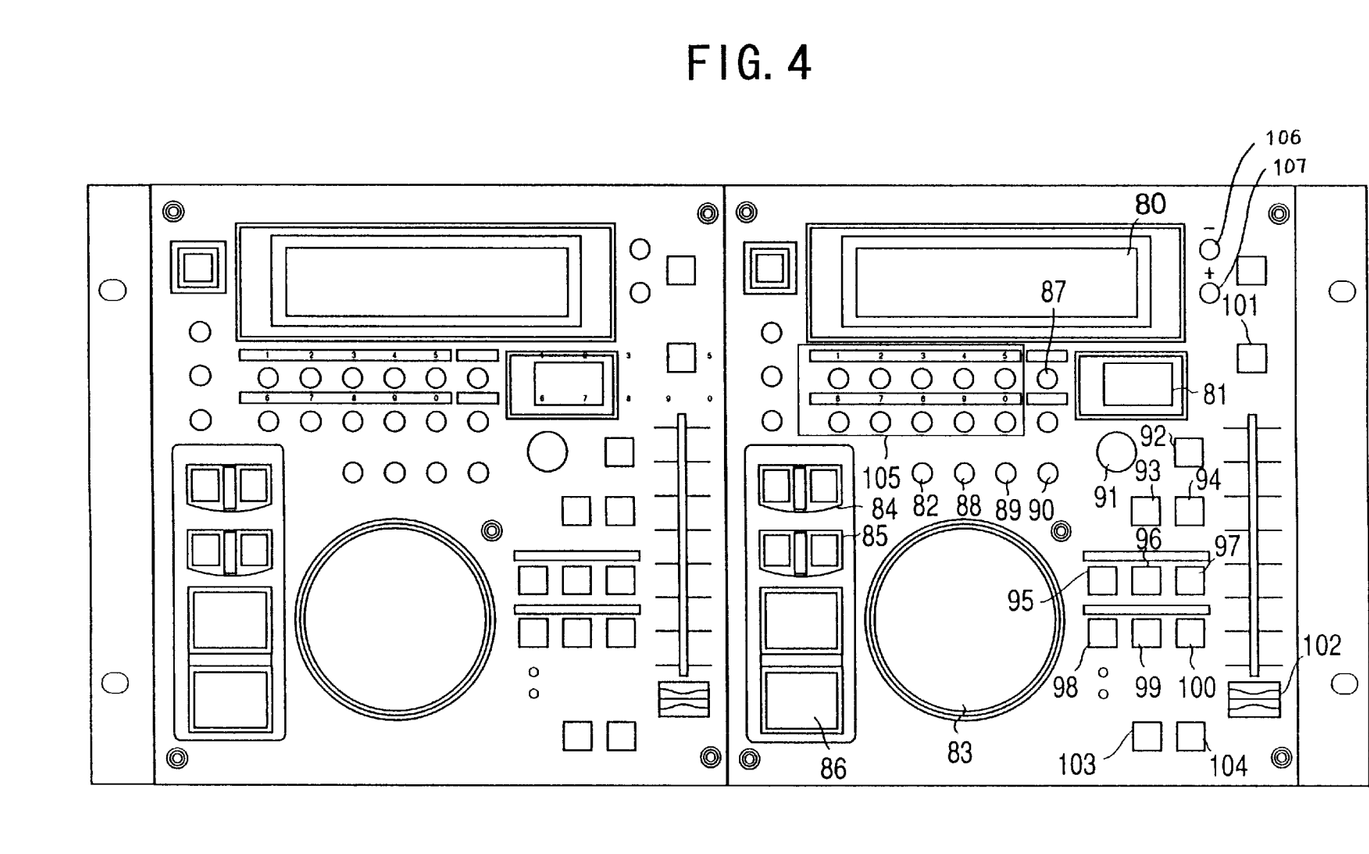
FIG. 4 is a plan view of two controller units of a pair of the recording medium reproducing devices.

The recording medium reproducing device shown in FIG. 1 is arranged with another recording medium reproducing device as a pair. Each of the main microcomputers 12 of the pair of the recording medium reproducing devices operates in accordance with the other by sending and receiving control information to and from each other. FIG. 4 is a plan view of the two controller units 40 of the pair of the recording medium reproducing devices. Since each of the two controller units 40 of the pair of the recording medium reproducing devices has the same structure as each other, reference characters are provided only for one of the two controller units 40 in FIG. 4.

In FIG. 4, a display part 80 of the display 44 displays various information such as a track number and a time code. A display part 81 displays a BPM value. Such operation keys of the operation unit 46 are provided as a preset key 82, a jog dial 83, a skip key 84, a search key 85, a play/pause key 86, a bank key 87, a memory key 88, a recall key 89, an enter key 90, a TAP key 91, a BPM key 92, a tempo synch key 93, a beat synch key 94, a loop key 95, an A key 96, a B key 97, a sample key 98, an IN key 99, an OUT key 100, a tempo key 101, a tempo volume 102, a scratch key 103, a brake key 104, a ten-key pad 105, a minus key 106 and a plus key 107.

In the recording medium reproducing device having tempo control and key control functions according to the present invention, when using the tempo control function whereby a tempo of a musical composition is adjusted, the tempo key 101 is pressed to adjust a variable width of a tempo. Each time the tempo key 101 is pressed, the variable width changes to ±8 percent, ±16 percent, ±32 percent, zero percent, ±8 percent and so forth. In order to adjust a tempo while the recording medium is reproduced, the tempo volume 102 is moved up and down to a predetermined position so that the variable width changes to ±8 percent, ±16 percent or ±32 percent from zero percent at the middle. When the tempo adjustment is in operation, a key also varies according to the variable width of the tempo, and a key display also varies according to this change in the key.

On the other hand, when using the key control function whereby a key of a musical composition is adjusted, each of the minus key 106 and the plus key 107 is pressed to adjust the key. In the key control function, each time the minus/plus key is pressed, the key of a musical composition is adjusted in either predetermined percentage units or semitone units.

Figure 5:
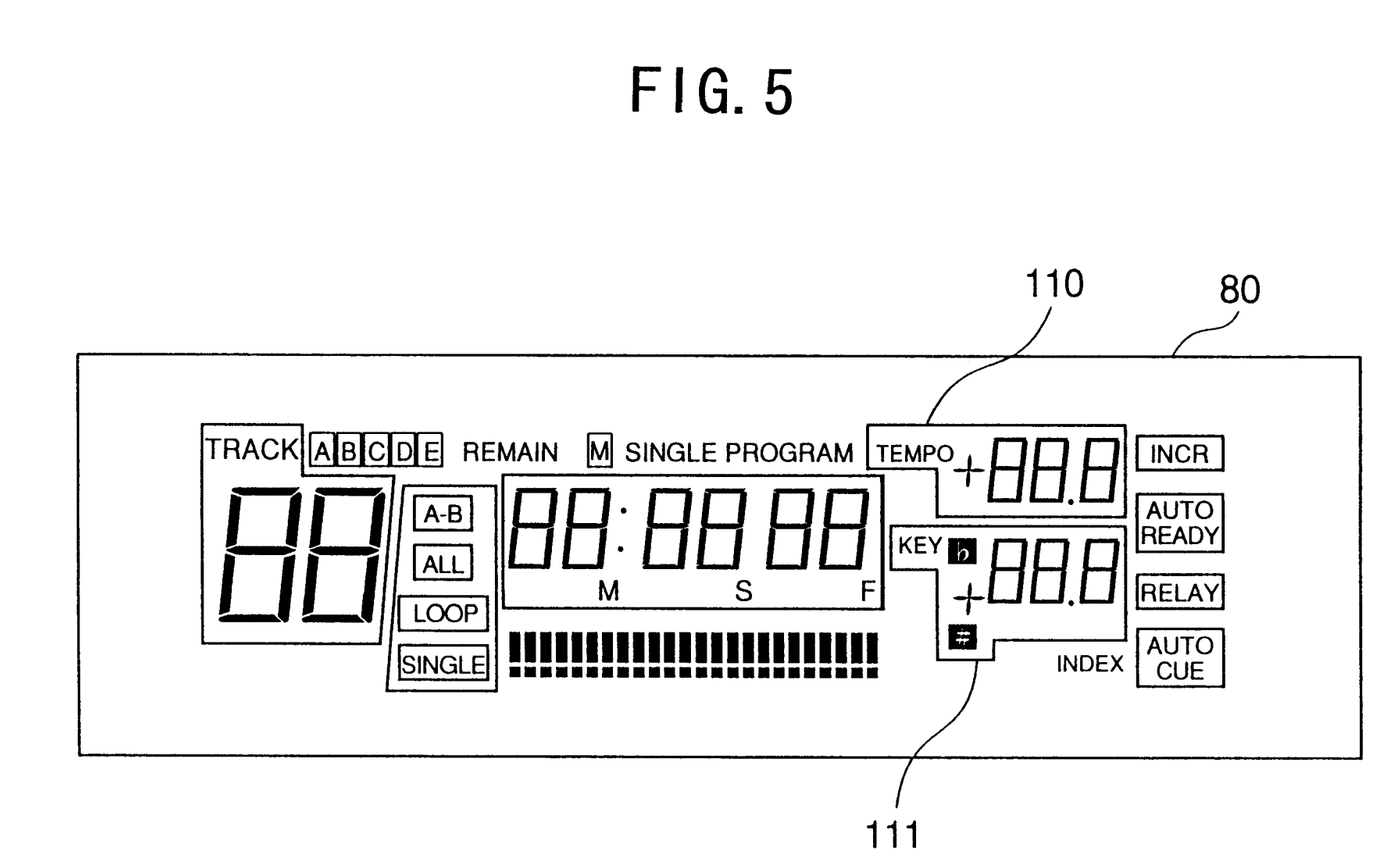
FIG. 5 is an illustration of details of a display part of a display.

FIG. 5 is an illustration of details of the display part of the display.

In FIG. 5, the display part 80 of the display 44 has a tempo display 110 concerning the tempo control function and a key display 111 concerning the key control function. The tempo and the key are displayed in predetermined percentage units.

As mentioned above, when adjusting a tempo using the tempo key 101 or the tempo volume 102, ±8 percent, ±16 percent or ±32 percent is displayed on the tempo display 110. When this tempo control function is used, not only the tempo after the adjustment is displayed on the tempo display 110, but also a variable width of the key changed according to the tempo adjustment is simultaneously displayed on the key display 111.

In this operation, if the key adjustment has been conducted by pressing each of the minus key 106 and the plus key 107, the key value changed according to the variable width of the tempo is added to the key value displayed after the key adjustment, and the summed value is displayed on the key display 111.

Figure 6:
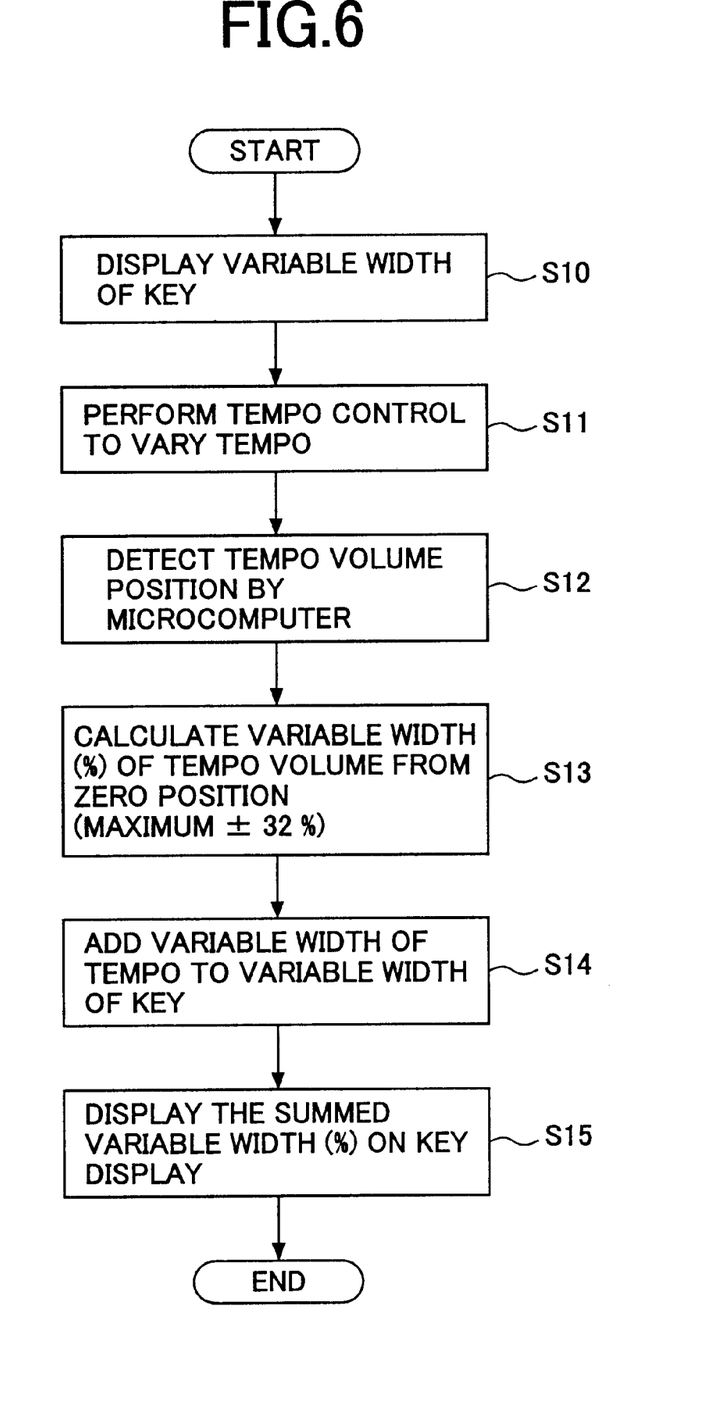
FIG. 6 is a flowchart of an embodiment of a key display process in a tempo control function.

FIG. 6 is a flowchart of an embodiment of the key display process in the tempo control function. First, in a step S10, a variable width of a key adjusted by the key control function is displayed on the key display 111. Next, in a step S11, the tempo control is performed to vary a tempo. That is, the tempo volume 102 shown in FIG. 4 is moved up and down to a predetermined position so that the tempo is varied. Then, in a step S12, the microcomputer 42 shown in FIG. 1 detects the position of the tempo volume 102. According to the detection result, in a step S13, a variable width of the tempo volume 102 from a zero percent position is calculated in percentage, for example, with a maximum variable width being ±32 percent. In a step S14, the calculated variable width of the tempo volume is added, as a variable width of the key according to the tempo adjustment, to the variable width of the key displayed in the step S10. In a step S15, the value summed in the step S14 is displayed on the key display 111 in percentage.

As mentioned above, a variable width of a tempo is calculated from a position of the tempo volume and is added to a variable width of a key, and then, the sum value is displayed on the key display so as to achieve an accurate key display corresponding to the tempo control.

Figure 7:
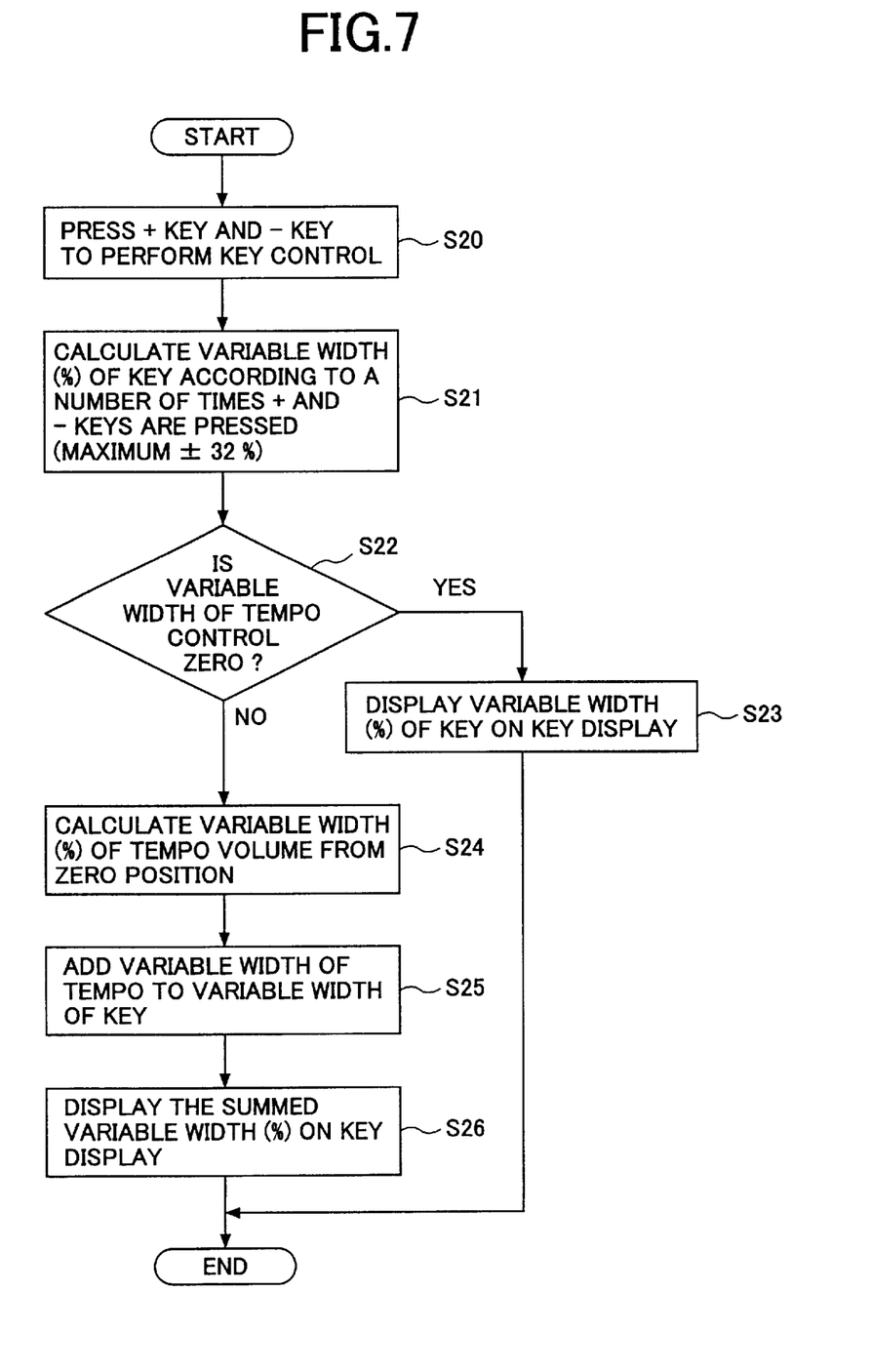
FIG. 7 is a flowchart of an embodiment of a key display process in a key control function.

FIG. 7 is a flowchart of an embodiment of the key display process in the key control function. First, in a step S20, each of the minus key 106 and the plus key 107 for the key control is pressed to adjust a key. Next, in a step S21, a rate of a variable width of a key is calculated in percentage according to a number of times that each of the minus key 106 and the plus key 107 is pressed in the step S20. For example, if a percentage unit for each press is predetermined as ±0.2 percent, pressing the plus key 107 five times makes 1 percent. Or else, the rate of the variable width of the key is calculated in a manner whereby, when the plus key 107 is kept pressed, every 0.2 seconds makes 0.2 percent up. Then, in a step S22, whether a variable width of the tempo control is zero or not is judged. If the variable width of the tempo control is zero, the calculated variable width of the key is displayed on the key display 111 in percentage, in a step S23.

On the other hand, if the variable width of the tempo control is not zero, a variable width of a tempo volume from a zero percent position is calculated in percentage, in a step S24. In a step S25, the calculated variable width of the tempo volume is added, as a variable width of the key according to the tempo adjustment, to the variable width of the key calculated in the step S21. In a step S26, the value summed in the step S25 is displayed on the key display 111 in percentage.

As mentioned above, a variable width of a key is calculated according to a number of times that each of the minus key and the plus key is pressed, and is added to a variable width of a tempo, and then, the sum value is displayed on the key display so as to achieve an accurate key display corresponding to the tempo control.

The steps using the tempo volume 102 shown in FIG. 6 and FIG. 7 can be performed also using the tempo key 101. Either or both of the microcomputer 42 and the main microcomputer 12 can perform the steps of calculating and adding.

It should be noted that, although a CD is used as a recording medium in the above-mentioned embodiments, the recording medium is not limited to these embodiments, but such recording mediums as a DVD (Digital Versatile Disc), a MD (Mini Disc), a memory stick and a flash memory may be substituted for the CD.

It should also be noted that the steps S13 and S24 correspond to the means for calculating, the steps S14 and S25 correspond to the means for adding and the steps S15, S23 and S26 correspond to the means for displaying.

The present invention is not limited to the specifically disclosed embodiments, and variations and modifications may be made without departing from the scope of the present invention.

Figure 8:
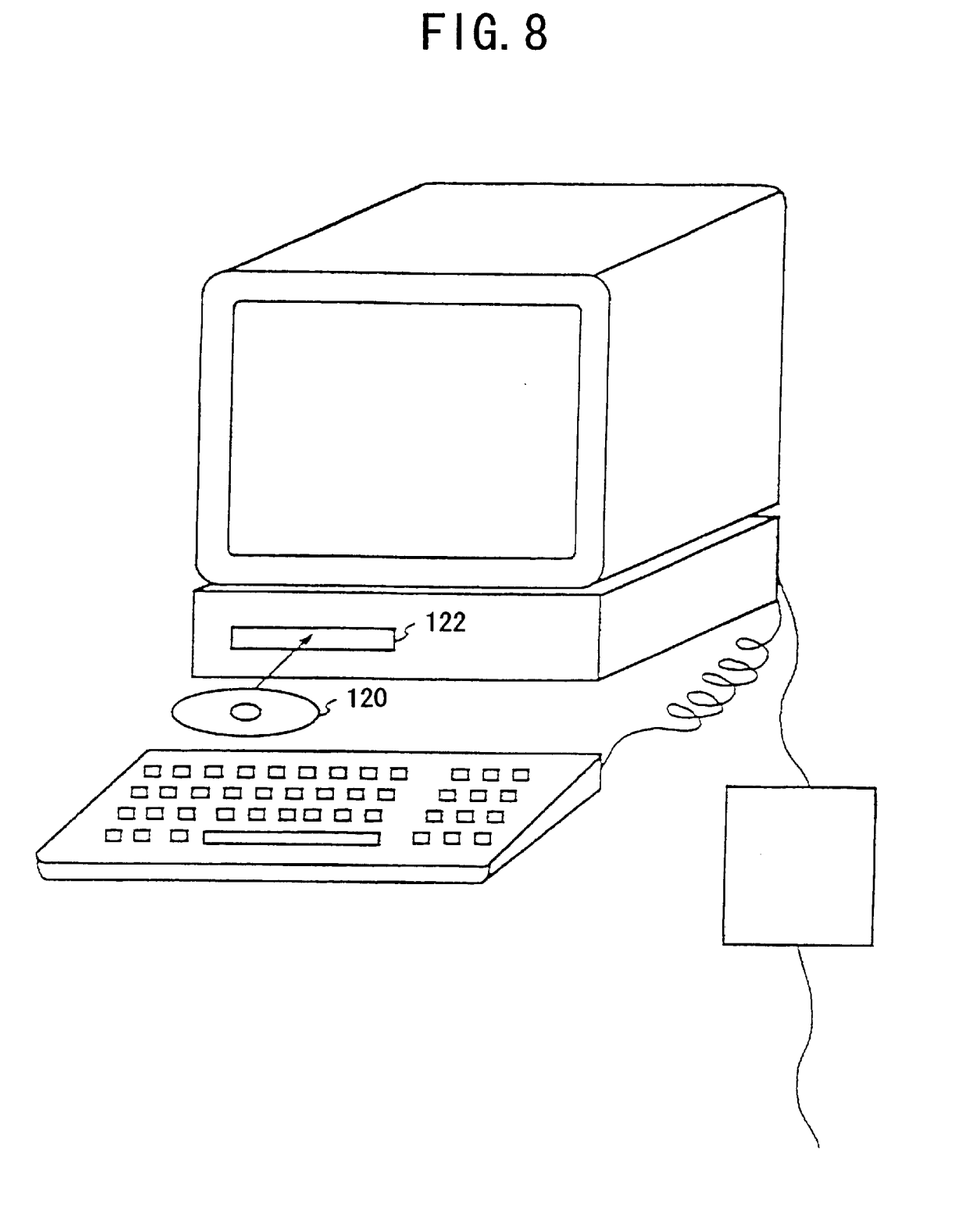
FIG. 8 is a perspective view of such an apparatus as a PC that reads a processor readable medium and conducts instructions stored therein, the instructions corresponding to the processes according to the embodiments in FIG. 6 and FIG. 7.

A CD-ROM 120 shown in FIG. 8, which is a processor readable medium, may store either encoded or non-encoded instructions. The instructions may be installed from the CD-ROM 120 to a hard disk drive 122 of such an apparatus as a PC first, transferred to a RAM and then read by a CPU. The CD-ROM 120 may store either all or part of the instructions corresponding to the processes explained in the embodiments and the flow charts in FIG. 6 and FIG. 7.

The present application is based on Japanese priority application No. 2000-050081 filed on Feb. 25, 2000, the entire contents of which are hereby incorporated by reference.

What is claimed is:

1. A recording medium reproducing device which adjusts a tempo and a key of music reproduced from audio data recorded on a recording medium, said device comprising:

means for calculating a variable width of the key according to a varied tempo;

means for adding said calculated variable width of the key to a variable width of the key according to a varied key so as to have a summed variable width of the key; and means for displaying said summed variable width of the key.

2. The recording medium reproducing device as claimed in claim 1, further comprising means for calculating said variable width of the key according to the varied key wherein the variable width of the key is summed according to the recalculation of the variable width of the key.

3. The recording medium reproducing device as claimed in claim 1, further comprising means for judging whether a tempo is not varied so as to display said variable width of the key according to the varied key.

4. A method of processing audio data reproduced from a recording medium, music of the audio data having a tempo and a key varied, said method comprising the steps of:

calculating a variable width of the key according to a varied tempo;

adding said calculated variable width of the key to a variable width of the key according to a varied key so as to have a summed variable width of the key; and displaying said summed variable width of the key.

5. The method as claimed in claim 4, further comprising the step of calculating said variable width of the key according to the varied key and summing the variable width of the key according to said recalculated variable width of the key.

6. The method as claimed in claim 4, further comprising the step of judging whether a tempo is not varied so as to display said variable width of the key according to the varied key.

7. A processor readable medium storing program code for causing a computer to adjust a tempo and a key of music reproduced from audio data, said medium comprising:

first program code means for calculating a variable width of the key according to a varied tempo;

second program code means for adding said calculated variable width of the key to a variable width of the key according to a varied key so as to have a summed variable width of the key; and third program code means for displaying said summed variable width of the key.

8. The medium as claimed in claim 7, further comprising program code means for calculating said variable width of the key according to the varied key wherein the variable width of the key is summed according to the recalculation of the variable width of the key.

9. The medium as claimed in claim 7, further comprising program code means for judging whether a tempo is not varied so as to display said variable width of the key according to the varied key.

* * * * *

UNITED STATES PATENT AND TRADEMARK OFFICE
CERTIFICATE OF CORRECTION

PATENT NO. : 6,661,753 B2
DATED : December 9, 2003
INVENTOR(S) : Inoue et al.

It is certified that error appears in the above-identified patent and that said Letters Patent is hereby corrected as shown below:

<u>Title page,</u>
Item [30], should read
-- Foreign Application Priority Data
Feb. 25, 2000 (JP) 2000-050081 --

Signed and Sealed this

Twentieth Day of April, 2004

JON W. DUDAS
*Acting Director of the United States Patent and Trademark Office*